(12) United States Patent
Seel

(10) Patent No.: US 8,579,758 B2
(45) Date of Patent: Nov. 12, 2013

(54) METHOD AND DEVICE FOR OPERATING A HYBRID DRIVE DEVICE DURING THE START OF AN INTERNAL COMBUSTION ENGINE

(75) Inventor: Andreas Seel, Bonn (DE)

(73) Assignee: Robert Bosch GmbH, Stuttgart (DE)

( * ) Notice: Subject to any disclaimer, the term of this patent is extended or adjusted under 35 U.S.C. 154(b) by 239 days.

(21) Appl. No.: 12/998,190

(22) PCT Filed: Aug. 17, 2009

(86) PCT No.: PCT/EP2009/060603
§ 371 (c)(1),
(2), (4) Date: Jun. 8, 2011

(87) PCT Pub. No.: WO2010/034570
PCT Pub. Date: Apr. 1, 2010

(65) Prior Publication Data
US 2011/0230307 A1    Sep. 22, 2011

(30) Foreign Application Priority Data
Sep. 26, 2008 (DE) .......................... 10 2008 042 395

(51) Int. Cl.
*B60W 10/02* (2006.01)
*B60W 10/08* (2006.01)

(52) U.S. Cl.
USPC ................................. 477/5; 477/108

(58) Field of Classification Search
USPC ................................ 477/5, 108, 181
See application file for complete search history.

(56) References Cited

U.S. PATENT DOCUMENTS

| 8,298,117 B2 * | 10/2012 | Seel et al. ................. 477/5 |
| 2003/0004032 A1 * | 1/2003 | Tamor .................... 477/5 |
| 2008/0064561 A1 * | 3/2008 | Popp et al. ............... 477/5 |

FOREIGN PATENT DOCUMENTS

| DE | 102 60 435 | 7/2004 |
| DE | 10 2004 002 061 | 8/2005 |
| DE | 10 2007 010 770 | 9/2008 |
| WO | WO 2008/043712 | 4/2008 |

* cited by examiner

*Primary Examiner* — Edwin A Young
(74) *Attorney, Agent, or Firm* — Kenyon & Kenyon LLP

(57) ABSTRACT

In a method for operating a hybrid drive device for a motor vehicle having at least one internal combustion engine, another drive unit and a separating clutch, to start the internal combustion engine the separating clutch is engaged, and during the start of the internal combustion engine, a setpoint rotational speed is predefined for the other drive unit. This setpoint rotational speed for the other drive unit is determined with the aid of a drivetrain model.

9 Claims, 1 Drawing Sheet

METHOD AND DEVICE FOR OPERATING A HYBRID DRIVE DEVICE DURING THE START OF AN INTERNAL COMBUSTION ENGINE

BACKGROUND OF THE INVENTION

1. Field of the Invention

The present invention relates to a method and a device for operating a hybrid drive device having an internal combustion engine, another drive unit, and a separating clutch which is engaged to start the internal combustion engine.

2. Description of Related Art

Such methods and devices are already known from the related art. Hybrid vehicles having a parallel hybrid drive usually have an internal combustion engine, at least another drive unit, in particular an electric machine, and a transmission for setting the transmission ratio between input and output in the drivetrain. If there is a separating clutch between the internal combustion engine and the other drive unit, then the vehicle may be driven jointly by the internal combustion engine and the other unit, or by only the other unit alone. If the vehicle is driven only by the other unit, then the internal combustion engine may be started by engaging the separating clutch. As long as the internal combustion engine is not yet generating any drive torque, it counteracts the torque of the other drive unit. As soon as the internal combustion engine is started, the drive torque of the internal combustion engine is added to the drive torque of the other drive unit. The start of the internal combustion engine is a dynamic process, which exhibits an irregular pattern of the drive torque of the internal combustion engine. To ensure comfortable driving of the vehicle, the drive torque of the drivetrain should not be disturbed by this dynamic start. Instead, the drive torque of the drivetrain should always correspond to the driver's torque request.

A method for operating a hybrid drive device is known from published international patent application document WO 2008/043712 A1. To start the internal combustion engine, a separating clutch is engaged. It is provided that, as a function of the rotational speed of the turbine wheel of the torque converter, such a rotational speed is predefined for the electric machine that no torque jump occurs at the hybrid drive during the starting process of the internal combustion engine.

BRIEF SUMMARY OF THE INVENTION

According to the present invention, a method and a device for operating a hybrid drive device for a motor vehicle are provided, which has at least one internal combustion engine, another drive unit, in particular an electric machine, a drivetrain model, and a separating clutch which is engaged to start the internal combustion engine. During the start of the internal combustion engine, a setpoint rotational speed for the other drive unit is predefined in such a way that a change in the drive torque occurs only as a function of a driver's torque request, the setpoint rotational speed for the other drive unit being determined with the aid of a drivetrain model. The setpoint rotational speed is thus determined not as a function of the instantaneous rotational speed of the other drive unit, but with the aid of a drivetrain model. The technical background for the method and the device according to the present invention is that the setpoint rotational speed for the other drive unit is determined with the aid of a drivetrain model which is not influenced by the disturbances of the dynamic start of the internal combustion engine. On the basis of this drivetrain model, the setpoint rotational speed for the other drive unit is determined, which the other drive unit would exhibit without the start of the internal combustion engine. The setpoint rotational speed thus ascertained for the other drive unit is predefined to the rotational speed controller as a setpoint value. It is essential that no vehicle or drivetrain variables that are fed back enter into the formation of the setpoint rotational speed for the other drive unit, since the variables fed back may contain a distortion due to the starting process.

Consequently, no internal combustion engine torque or clutch torque is taken into account; rather, only a model rotational speed is calculated, starting from the driver's current torque request, based on an inertia model. The setpoint rotational speed for the other drive unit is not thereby compared with the actual rotational speed, as is usually done when regulating the rotational speed of the other drive unit, but rather the setpoint rotational speed for the other drive unit is compared with the modeled setpoint rotational speed for the start of the internal combustion engine. Advantageously, the rotational speed pattern during the start of the internal combustion engine thus behaves exactly as if the internal combustion engine has not been started at all. Thus the driver does not notice any difference in the driving behavior, nor do unexpected torque jumps result during acceleration of the vehicle.

In one refinement of the present invention, the drivetrain model receives the driver's torque request as an input variable, and outputs the setpoint rotational speed for the other drive unit as an output variable. In this case the drivetrain model includes at least one converter model. The technical background of this embodiment is that the driver provides a so-called driver's torque request to the hybrid vehicle, for example with the aid of a gas pedal. The driver's torque request is thus the torque value that the driver is currently providing to accelerate the vehicle. This driver's torque request is conveyed as an input variable to the drivetrain model, in particular a mathematical drivetrain model. The drivetrain model includes at least one converter model, which models at least one pump wheel and one turbine wheel. The output variable of this drivetrain model is the setpoint rotational speed for the other drive unit. With the aid of a converter model, the pump torque and the turbine torque are determined in the currently modeled pump wheel speed and turbine wheel speed. The pump wheel speed and the turbine wheel speed are determined as a function of the driver's current torque request, the inertias, and the converter transmission function. The converter transmission function is present in particular as a characteristic curve or a characteristic field, or is ascertained currently. At the beginning of the start of the internal combustion engine, the drivetrain model is initialized with the current actual values, i.e., the pump wheel speed, the turbine wheel speed and the variables ascertained from the vehicle model, which is modeled in particular by the driving resistance equation, so that a jump-free transition to the drivetrain model takes place. The pump torque and the turbine torque generate the resulting electric machine rotational speed. The modeled turbine wheel speed results from the modeled turbine torque and the vehicle model. Advantageously, the driver's torque request is thus used as an input variable which is not influenced by the start of the internal combustion engine. Since the drivetrain model is also not influenced by the start of the internal combustion engine, a setpoint rotational speed for the other drive unit is formed whose pattern does not take into account the start of the internal combustion engine.

Thus, disturbing influences that are caused by the start of the internal combustion engine do not enter into the determination of the setpoint rotational speed for the other drive unit.

Another refinement of the present invention provides that the converter model takes into account mechanical properties, in particular rotational inertias, of a pump wheel, a turbine wheel and/or a torque converter lockup clutch, or also the interaction with one another, in particular the torque transferred from the pump wheel to the turbine wheel. Additional parameters, consideration of which results in even more exact modeling, are, for example, friction and flow losses of the individual components, as well as dynamic effects, such as, for example, the build-up of the oil flow as the components are turned on. The technical background of this embodiment is that the converter model takes into account the mechanical properties of the pump wheel, the turbine wheel, and/or a torque converter lockup clutch. Mechanical properties to be taken into account in this case are in particular the inertias of the individual components. The torque converter lockup clutch transfers a torque via friction linings, parallel to the hydraulic path. Starting from the sum of the torques, the setpoint rotational speed is found according to the formula:

$$\sum M = J \cdot \dot{\omega} \Leftrightarrow n = \frac{60}{J \cdot 2\pi} \int \sum M$$

where $\dot{\omega}$ is the angular acceleration and J is the rotational inertia. In connection with the input variable, the driver's torque request, the setpoint rotational speed for the other drive unit is thus ascertainable. Advantageously, the setpoint rotational speed for the other drive unit may thus be ascertained on the basis of physics.

In another refinement of the present invention it is provided that the drivetrain model includes a dual mass model with an interconnected converter model. In particular, modeling of the drivetrain elasticity may be dispensed with in this case, since the latter has only a minimal influence on the setpoint rotational speed. The technical background of this embodiment is that the very expensively (computing time, memory requirement) programmed modeling of the drivetrain elasticity, which would result in a non-linear multiple-body oscillating system, is avoided. The advantage of this is that a preferably simple substitute model is used, which may be programmed and parameterized with little effort. The resulting error is negligible.

In another refinement of the present invention, it is provided that a turbine wheel speed is ascertained from the driving speed of the vehicle and a transmission ratio. The technical background for this is that to determine the instantaneous turbine wheel speed, the possibility exists of ascertaining the latter from the driving speed of the vehicle and the instantaneous transmission ratio. Measuring devices for ascertaining the driving speed of a vehicle are generally known, and are customary today in vehicles. The instantaneous transmission ratio is ascertainable from the transmission control unit. With the aid of these two variables, it is possible to determine the turbine wheel speed, which is used advantageously to calculate the setpoint rotational speed for the other drive unit in the drivetrain model. In this case one reverts to the measured driving speed. Because of the high mass of the vehicle, the start of the internal combustion engine has practically no influence on the driving speed. That allows the drivetrain model to be greatly simplified. As a result, fewer resources are needed in the control unit, and the application and/or parameterizing is simplified.

In another refinement, it is provided that the instantaneous transmission ratio is ascertained prior to starting the internal combustion engine as the relationship of vehicle velocity to turbine wheel speed. The technical background for this is that prior to starting the internal combustion engine the instantaneous transmission ratio is determinable as the relationship of vehicle velocity to turbine wheel speed. Prior to starting the internal combustion engine, the turbine wheel speed is not superimposed by the disturbances which arise during the start of the internal combustion engine. As a result, the transmission ratio may be determined advantageously prior to the start of the internal combustion engine.

In another refinement of the present invention, it is provided that the drivetrain model takes a driving resistance into account. Hence the drivetrain model is made up of at least a converter model and a vehicle model. This driving resistance may be ascertained, for example, on the one hand prior to the start of the internal combustion engine, from the relationship of the instantaneous torque of the other drive unit and the instantaneous acceleration of the vehicle. On the other hand, it may be determined from the driving resistance equation:

$$M_m \cdot \frac{i_{ges}}{r} \cdot \eta_{ges} = m \cdot g \cdot f \cdot \cos\alpha + m \cdot g \cdot \sin\alpha + e \cdot m \cdot a + c_w \cdot A \cdot \frac{\rho}{2} \cdot v^2$$

The driving resistance equation includes the following terms: left side of the equation: the instantaneous driving resistance as the driving force in the tire contact area; right side of the equation: sum of rolling resistance, climbing resistance, acceleration resistance and aerodynamic drag (source: *Kraftfahrtechnisches Taschenbuch*, p. 376, 25th edition; Vieweg Verlag, 2003).

In particular, this driving resistance is taken into account as a constant value during the start of the internal combustion engine. The technical background is that an instantaneous driving resistance is thus determined. The latter is regarded in particular as a constant value during the start of the internal combustion engine, since the driving resistance does not change significantly during the brief time required to start the internal combustion engine.

Advantageously, the driving resistance is thus taken into account in the physically based drivetrain model.

In another refinement of the present invention, it is provided that the drivetrain model receives the driver's torque request as an input variable and outputs the setpoint rotational speed for the other drive unit as an output variable, and includes at least one model of a starting element. The technical background for this is that the drivetrains of parallel hybrid vehicles have different starting elements. Depending on the transmission type, whether manual transmission, automatic, double clutch or continuously variable transmission, different starting elements are used, such as manually or automatically operated friction clutches, torque converters, or steel thrust belts. Advantageously, the corresponding starting element is modeled and taken into account in the drivetrain model.

DETAILED DESCRIPTION OF THE INVENTION

Figure 1:
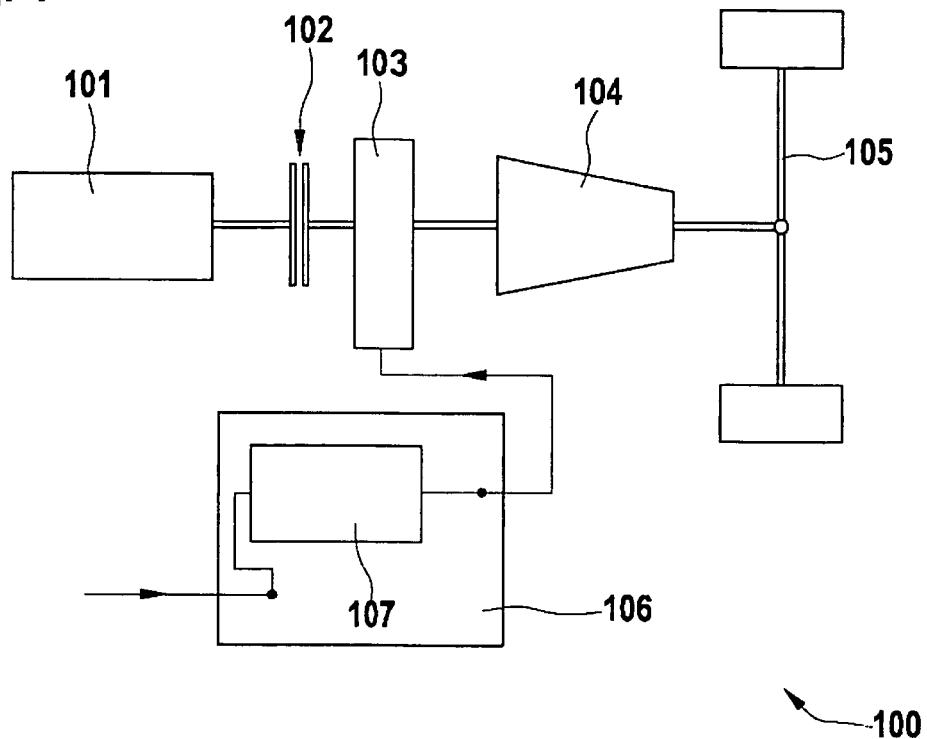
FIG. 1 shows a device for operating a hybrid drive device.

FIG. 1 shows a schematic depiction of an exemplary embodiment of an advantageous hybrid drive device. Hybrid drive device 100 has an internal combustion engine 101, a separating clutch 102, an electric machine 103, a transmission 104, and drive axle 105 with the drive wheels. Internal combustion engine 101 may be decoupled from the drivetrain with the aid of separating clutch 102. The device also has a control unit 106, which includes a drivetrain model 107. The driver's torque request is conveyed to the control unit and the drivetrain model as an input variable for the drivetrain model. As an output variable of the drivetrain model, the setpoint rotational speed for the other drive unit is output to electric machine 103 when internal combustion engine 101 is started by engaging separating clutch 102.

Figure 2:
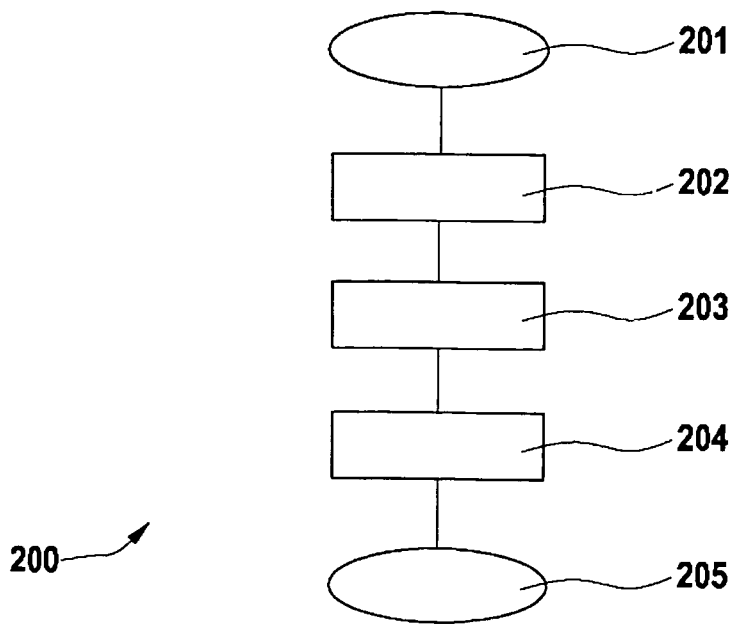
FIG. 2 shows a method for operating a hybrid drive device.

FIG. 2 shows a method for operating a hybrid drive device 200. The method starts with step 201. The driver's torque request, which is predefined by the driver, is read in in step 202. With the aid of the drivetrain model, the setpoint rotational speed for the other drive unit is determined in step 203 as a function of the driver's torque request. The setpoint rotational speed for the other drive unit is conveyed to the other drive unit in step 204. The method ends in step 205. During the start of the internal combustion engine by engaging the separating clutch, this method is constantly repeated.

What is claimed is:

1. A method for operating a hybrid drive for a motor vehicle, the hybrid drive having at least one internal combustion engine and an electric machine, and the motor vehicle having a separating clutch, the method comprising:
   selectively engaging the separating clutch to the internal combustion engine to start the internal combustion engine;
   predefining a setpoint rotational speed for the electric machine during the start of the internal combustion engine in such a way that a change in a drive torque of a drivetrain of the motor vehicle occurs only as a function of a driver's torque request irrespective of a torque of the internal combustion engine, wherein the setpoint rotational speed for the electric machine is determined with the aid of a drivetrain model.

2. The method as recited in claim 1, wherein the driver's torque request is inputted to the drivetrain model as an input variable, and the setpoint rotational speed for the electric machine is outputted by the drivetrain model as an output variable, and wherein the drivetrain model includes at least one converter model.

3. The method as recited in claim 2, wherein the converter model takes into account mechanical properties of at least one of a pump wheel, a turbine wheel and a torque converter lockup clutch, wherein the mechanical properties include at least inertia.

4. The method as recited in claim 2, further comprising:
   determining a turbine speed from a vehicle velocity and a transmission ratio.

5. The method as recited in claim 4, wherein the transmission ratio is predetermined prior to the start of the internal combustion engine, as a relationship of the vehicle velocity to the turbine speed.

6. The method as recited in claim 1, wherein the drivetrain model includes a dual mass model with an interconnected converter model.

7. The method as recited in claim 1, wherein the drivetrain model takes into account a driving resistance ascertained prior to the start of the internal combustion engine, and wherein the driving resistance is ascertained based on a relationship of the instantaneous torque of the electric machine and the instantaneous acceleration of the vehicle, and wherein the driving resistance is taken into account as a constant value during the start of the internal combustion engine.

8. The method as recited in claim 1, wherein the driver's torque request is inputted to the drivetrain model as an input variable, and the setpoint rotational speed for the electric machine is outputted by the drivetrain model as an output variable, and wherein the drivetrain model includes at least one model of a starting element.

9. A control device for operating a hybrid drive for a motor vehicle having at least one internal combustion engine, an electric machine, and a separating clutch selectively engaged to start the internal combustion engine, comprising:
   a control unit configured to define a setpoint rotational speed for the electric machine during the start of the internal combustion engine in such a way that a change in a drive torque of a drivetrain of the motor vehicle occurs only as a function of a driver's torque request irrespective of a torque of the internal combustion engine, wherein the control unit includes a drivetrain model, and wherein the setpoint rotational speed for the electric machine is defined using the drivetrain model.

* * * * *

UNITED STATES PATENT AND TRADEMARK OFFICE
CERTIFICATE OF CORRECTION

PATENT NO. : 8,579,758 B2  Page 1 of 1
APPLICATION NO. : 12/998190
DATED : November 12, 2013
INVENTOR(S) : Andreas Seel It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 311 days.

Signed and Sealed this
Twenty-second Day of September, 2015

Michelle K. Lee
*Director of the United States Patent and Trademark Office*